United States Patent [19]

Schulman

[11] 3,780,631
[45] Dec. 25, 1973

[54] MONOCHROMATIC PHOTOGRAPHIC EXPOSURE PROCESS AND APPARATUS

[76] Inventor: Norman S. Schulman, 55 Grist Mill Ln., Great Neck, N.Y. 11023

[22] Filed: June 23, 1972

[21] Appl. No.: 265,574

[52] U.S. Cl.............. 95/10 C, 95/10 R, 95/10 CT, 95/10 CD, 356/225
[51] Int. Cl............................................. G01j 1/00
[58] Field of Search............. 95/10 R, 10 C, 10 CT; 250/200; 350/311; 356/225; 313/94; 136/89

[56] References Cited
UNITED STATES PATENTS
3,648,580   3/1972   Yanagi et al. ................... 95/10 CT
3,554,633   1/1972   Sekine .............................. 352/141

OTHER PUBLICATIONS
Wratten Light Filters, 8/30/54, page 58.

*Primary Examiner*—Samuel S. Matthews
*Assistant Examiner*—Russell E. Adams, Jr.
*Attorney*—William T. Hough et al.

[57] ABSTRACT

A process of filtering out from natural light that light of wave lengths greater than about 4800 angstroms and less than about 4500 angstroms, directing the filtered light of about 4500 to about 4800 angstroms onto a photosensitive cell and metering the response of the photosensitive cell and directly proportional to the metered response, controlling light exposure to an image-receiving mechanism such as a television-image-receiving tube or a camera film, typically by controlling shutter speed and/or by controlling iris-aperture diameter of the camera, and the controlling of the light exposure may be either calculated on the basis of a meter reading or may be automatic through electrical circuits, whereby compensation is made for variations in spectral quantity of light source as well as compensation being thereby made for various reflectiveness of subject matter being metered.

7 Claims, 7 Drawing Figures

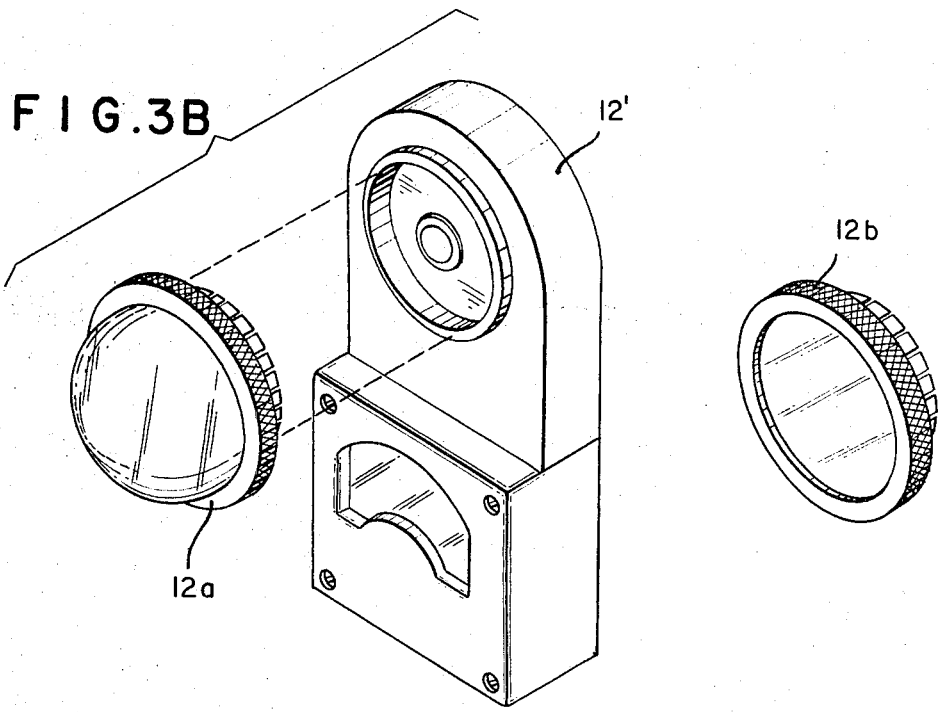
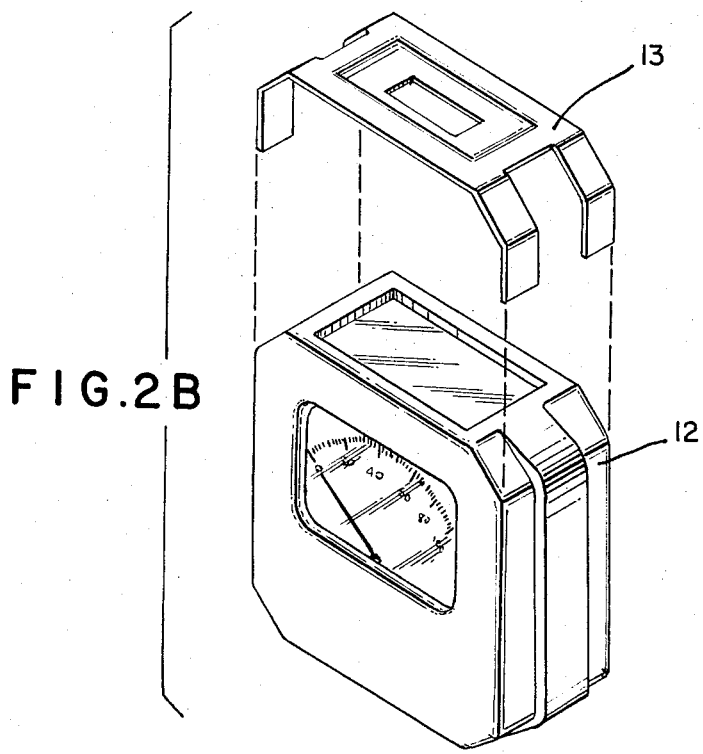

MONOCHROMATIC PHOTOGRAPHIC EXPOSURE PROCESS AND APPARATUS

This invention relates to a process and apparatus for photographic exposure metering of natural light and regulating the exposure relative to the intensity of the light metered.

BACKGROUND TO THE INVENTION

The spectral quantity of natural light varies considerably as shown in the attached FIG. 1, depending upon whether the subject being exposed is subject to illumination from the sky or directly by the sun or an intense reflection of varied light. Light from these two sources is also varied considerably, with the noon sun contributing more than six times as much light than the sky under some conditions. Existing metering systems integrate light received across the entire spectrum and thus are dependent on being set according to a known spectral quantity of the source before calibration can be attempted. Therefore, existing integrating exposure meters calibrated from direct sunlight cannot be used in shade nor can those calibrated from reflected light in the shade be used for direct sunlight. This is true because an integrating metering system calibrated in the sun receives considerably more energy from the reddish-end of the light spectrum than is available from a blue sky source. Consequently when metering light from the sky alone, the integrating exposure meter will indicate less light than is actually available. Thus there is a problem with regard to reflectivity as used in the photographic sense, reflectivity being the extent of white light that is reflected back from a specific surface. The ability of any surface to reflect light is really the summation of an infinite number of reflectivities of individual wave lengths. Thus a red surface reflects a proportionately greater proportion of red light than any other wave length. The observed color of any object is merely a summation of an infinite number of specific wave lengths reflected back to the observer at different intensities.

As result of these problems encountered, resulting from differences in blue and red light or direct and reflected light, the photographic results with color film can range from reasonably good to notoriously bad, even though a person might be utilizing the suggested exposure times and intensities as dependent upon a particular meter that he might be employing such as either a selenium meter or a cadminium sulfide meter.

SUMMARY OF THE INVENTION

An object of the present invention is a photographic exposure meter system, including a process and apparatus for use under natural light conditions which will automatically compensate for variations in spectral quantity of the light source, and will automatically compensate for various reflectiveness of the subject matter being metered.

Another object is to identify a narrow band of radiation in the vicinity at which a peak energy wave length of the blue sky illumination is obtained.

Another object is to obtain a calibration basis that does not have to distinguish the spectral quantity of the source of illumination.

Another object is a process and an apparatus for performing the process of producing a correct exposure under any and all light conditions, for color film or other color photographing.

Another object is to oscillate a fixed set of conditions, regarding light source, film, and subject matter, such that there is only substantially one exposure which will reproduce all colors correctly, whereby any exposure which will reproduce one color correctly will reproduce all colors correctly.

Another object is to obtain a particular wave length and as a standard against which other exposures may be calculated.

Other objects become apparent from the preceding and following disclosure.

One or more objects of the present invention are obtained by the invention as defined herein.

Broadly the invention includes the utilization of a light filter which substantially excludes all wave lengths of light below about 4300 angstroms and above about 5000 angstroms, preferably substantially above and below about 4700 angstroms, and which accordingly transmits light therethrough of wave lengths ranging from about 4500 to about 4800 angstroms, preferably about 4700 angstroms, passing natural light therethrough from either or both direct sunlight and blue-sky type reflected light, directing the filtered selective light onto a photosensitive cell, and either the operator calibrating as based upon a meter reading, or alternatively automatically electronically controlling automatically camera shutter speed and/or iris aperture diameter in direct proportion to the intensity of the electric charge given off by the photosensitive cell. In particular, for example, if a high energy is registered by the photoelectric cell, a high intensity current would be given off which would accelerate shutter speed or which would close the iris to an increased degree resulting in each or both cases a smaller light exposure. The present process and apparatus is referred to by the inventor as a monochromatic exposure system based on the principle of measuring a narrow band of radiation in the vicinity of 4500 up to about 4800 angstroms, preferably about 4700 angstroms, which is about the peak energy wave length of blue sky illumination. Thus the monochromatic exposure system does not have to distinguish the spectral quantity of the source of illumination since only about one wave length or thereabout, is being measured. Direct sunlight contains the same 4500 to about 4800 angstrom components as does the blue sky, the sun in fact being the source and will then be recorded in the monochromatic exposure system. Once calibrated to produce the correct exposure under any natural light condition, the monochromatic exposure system will produce correct exposures under substantially all natural light conditions. This is true because as based on a fixed set of conditions regarding light source, film and subject matter, there is only one (plus or minus a few angstroms) exposure which will produce all colors correctly. Thus any exposure which will produce one color correctly will reproduce all colors correctly. In effect, the 4500 to 4800 angstroms wave lengths becomes a standard against which the other exposures are calibrated for different intensities of light.

A particular benefit of this process and apparatus, and of the monochromatic exposure system, is that it eliminates the problem of reflectivity as used in the photographic sense, as has already been discussed above. Thus, the greater reflectiveness of red colored objects as opposed to blue colored objects constitutes no problem when the shutter speed and/or iris size is controlled with regard to the setting as based on the narrow band of filtered light of the filter of this invention. The monochromatic exposure system of the present invention simply records its standard wave length at between about 4500 angstroms and 4800 angstroms, preferably the 4700 angstrom band, and computes preferably electronically automatically the correct exposure.

As is well known, in the photographic art, the selenium cell generates its own voltage. It is with this type cell that the results for the present invention might constitute the greater problem. With such a selenium cell, the scale would have to be recalibrated or there would have to be used a larger cell, or it would be necessary to use a more sensitive meter. Accordingly, the battery operated photosensitive cadmium sulfide cell and silicon cells each being more sensitive as a result of higher voltage obtained from batteries would be the preferred meters for utilization with the filter of the present invention. But even with the battery-driven meters, the readings become inaccurate and undependable if the battery is permitted to become substantially discharged thereby throwing-off the reliability of the reading. For the average non-professional user however, it is possible to use the selenium cell with the recalibrated scale, and with its own power source being inherent. For either of the type meters or any other photosensitive meter utilized in cameras as a part of the camera or separate from the camera in a separate meter device, the present invention includes such combinations.

THE FIGURES

FIG. 2B illustrates a typical appearance in perspective view of a selenium cell in exploded view, showing the attachment for limiting the amount of light where brightness is too great for proper metering.

FIG. 3B illustrates the typical appearance of the structure of a representative cadmium sulfide photometer in exploded perspective view, also illustrating a typical spare alternate flat filter.

DETAILED DESCRIPTION OF THE INVENTION

As noted above, the filter of the present invention may be utilized with any one or more of photometers, television cameras, or regular cameras such as a focal plane shutter camera or alternatively a leaf-shutter camera. As is known to the person skilled in photography, a focal plane shutter camera includes a mirror-mounted exposure surface in normally about less than one-fourth inch across, for the camera mounted photosensitive cell which for the present invention would have the mirror mechanism before the shutter but with the suspended mirror arranged when necessary such that the mirror flips up out of the way when the shutter is tripped. FIG. 5 is illustrative of a typical focal plane shutter camera. On the other hand, FIG. 4 although it is typically representative of a movie camera, is also typically representative of a leaf-shutter camera in which the photosensitive cell and shutter are within the lens system or lens mount typically.

Figure 1:
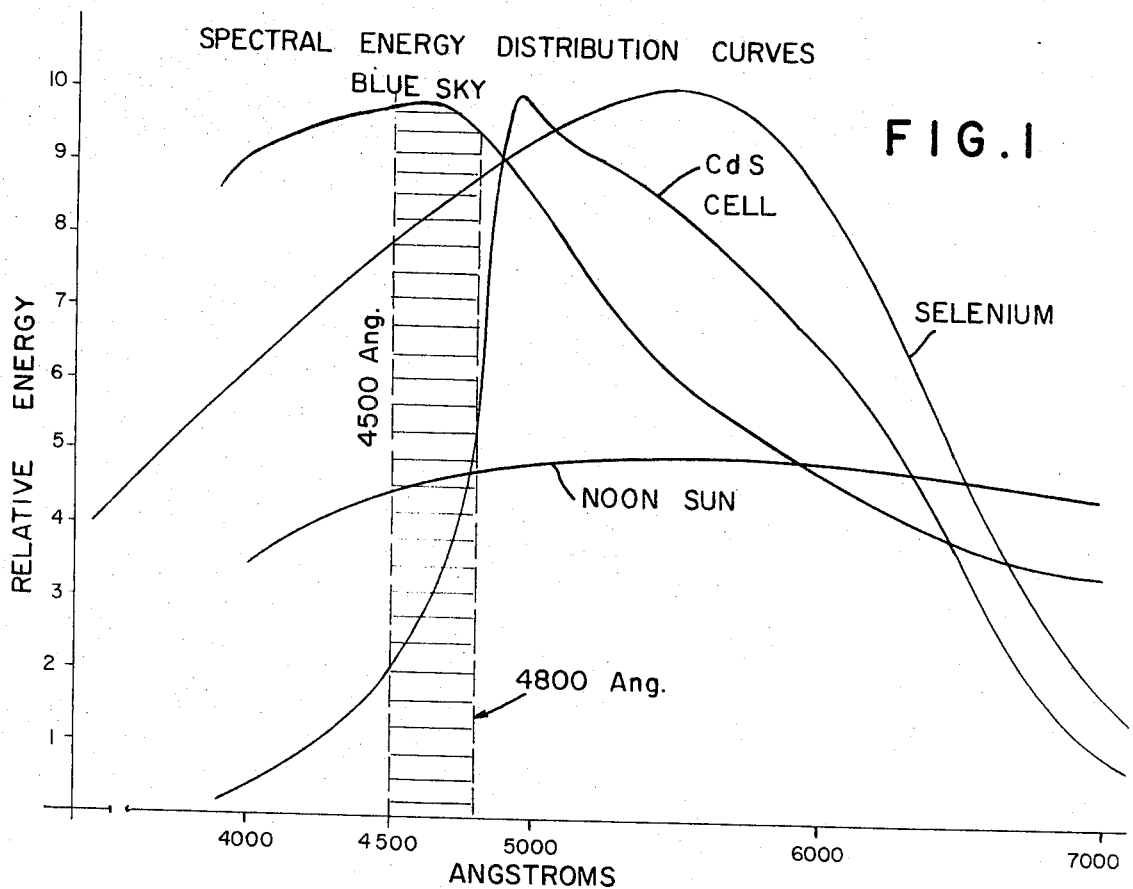
FIG. 1 illustrates a spectral energy distribution curves chart, utilizing two axes, one with the relative energy and the other representing the wave lengths of light.

In greater detail, FIG. 1 illustrates in graphic form a chart disclosing the relative intensity of light as in contrast to the wave lengths of light available as a result of light coming primarily from a noonday sun, as opposed to light coming primarily from reflected sources such as a blue sky. On the chart is identified the relative energy level of the noonday sun for various wave lengths of light as contrasted to the energy level of blue sky light for various wave lengths of light. As is well known, the blue sky light is recognized as being the weaker source of light for purposes of photographic cameras, television and the like. Accordingly, a controlling theory of the inventor leading to the present invention is that calibrations should be based on the wave lengths of light at which the relative energy level is at about its highest point and accordingly if all other calibrations are made on the meter or automatically responsive cameras on the basis of the same high-point for the blue sky light, as discussed above, the correct reading for one intensity of light will be the same reading as for another intensity of light, particularly in view of the fact that as may be noticed from the chart, the variations in relative energy of direct light — normally referred to as noon-sun light is very minor, and in particular the difference between the relative energy level at the blue-sky maximum intensity point, is only a minor degree less than the maximum relative energy level for noon-sunlight. Accordingly, as is shown on the FIG. 1 chart, the preferred range of light wave lengths utilized for metering purposes and for calculating and/or controlling shutter speed and/or camera aperture diameter is narrow band ranging from about 4500 angstroms to about 4700 angstroms. It is to be understood that obviously light for an extended band on either side of the 4500–4800 bands still would obtain reasonably good results for color photography, nevertheless the principal and preferred band ranges from the 4500 to the 4800 angstroms as is illustrated on the chart. Experimental results utilizing this band of filtered light by utilizing a filter which filters out substantially all light on either side of this band has resulted in consistently perfect or near-perfect production of color photographs, within the limitations of the sensitivity and reproducitivity of the particular color film utilized. Also shown on the chart is the relative sensitivity of typically the selenium cell and of the cadmium sulfide cell for various wave lengths, as well as for the selected band of the present invention. As is noted, the selenium photometer is much more sensitive to the high level or high intensity blue sky light of the present band than is typically the cadmium sulfide cell photometer. Provided that the selenium cell is manufactured and properly calibrated based on a filter included within the photometer, the selenium cell thus produces the more accurate results. However, the low detection level of the cadmium sulfide type cell photometer as well as the silicon cell photometers may improve the results significantly and possibly obtained, as noted above, better results by the utilization of batteries obtaining relatively high voltage as compared to the low-voltage selenium cell, whereby the high voltage photometers nevertheless are highly reliable for purposes of the present invention. By high voltage, is however meant to be reciprocal and conventional voltages currently utilized and the term high is merely relative to the extremely low voltage of the selenium cell. Although the graph is illustrated merely on the basis of relative light energy, the same graphic relationship would result if it were represented in terms of ergs or any other energy unit.

Figure 2A:
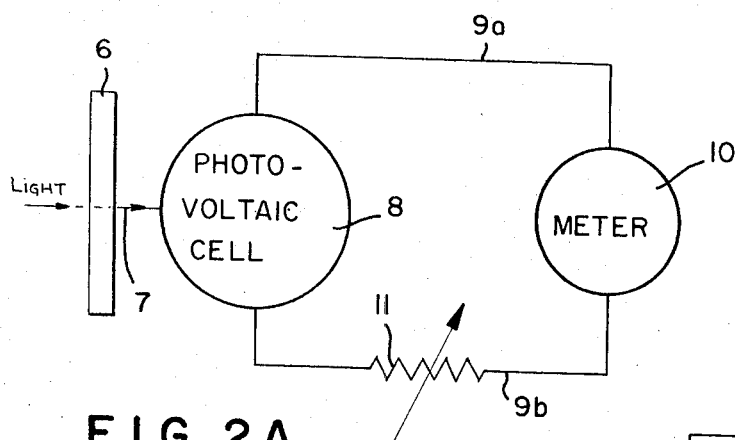
FIG. 2A illustrates a diagrammatic view of a photometer of the selenium cell type, showing the circuit thereof.

FIG. 2A illustrates diagrammatically light passing through a filter 6 which filters out all light excepting that band of light ranging from about 4500 angstroms to about 4800 angstroms in wave lengths, which light then strikes the photovoltaic cell 8, which generated current automatically passes along the circuitry 9a and 9b to and from the meter 10, there possibly being a variable rheostat 11 in circuit. FIG. 2B illustrates a typical selenium photometer 12 together with, shown in exploded view, a light-limiting device 13.

Figure 3A:
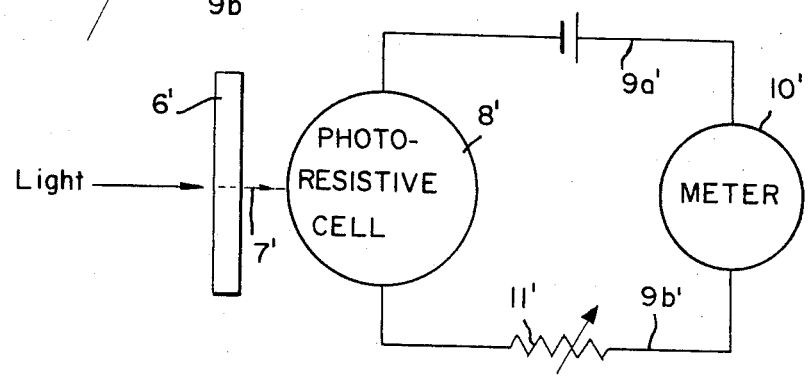
FIG. 3A illustrates a diagrammatic circuit view of typically a cadmium sulfide cell or a silicon cell, with a metering device.

FIG. 3A illustrates an analagous diagrammatic view of a filter of the present invention filtering out light wave lengths below and above the 4500 to 4800 angstrom band, which filtered light strikes the photosensitive cell of the typically cadmium sulfide cell which thereby results in the permitting of electrical flow therethrough, the greater the intensity, the greater the flow of current permitted through the cell through the circuit 9a' and 9b' to and from the meter 10', a typical meter of this type being illustrated in perspective view of FIG. 3B as meter 12'. The filter 12a is known in the art as a blue sky filter whereas the filter 12b is known as a direct-light filter. For purposes of the present invention, in order to obtain a most reliable reading, the flat direct-light filter such as that of 12b is the preferred filter to be utilized with such a photometer.

Figure 4:
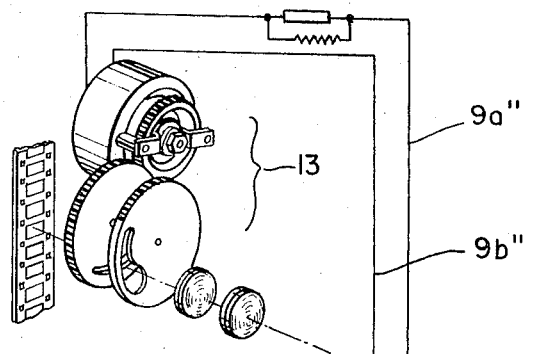
FIG. 4 illustrates in diagrammatic view the typical appearance of a movie camera mechanism in which the aperture diameter is controlled by a photometer utilizing the light filter of the present invention.
Figure 5:
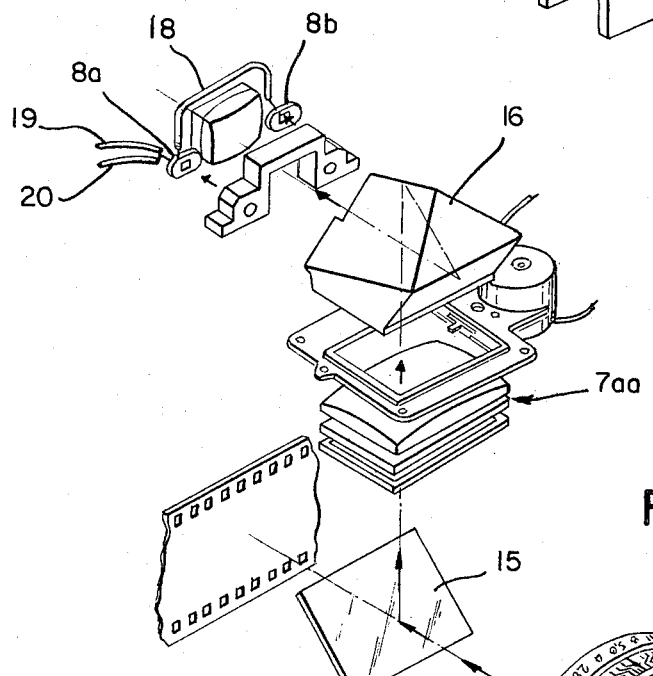
FIG. 5 illustrates a typical camera in diagrammatic view utilizing the filter of the present invention.
Figure 5:
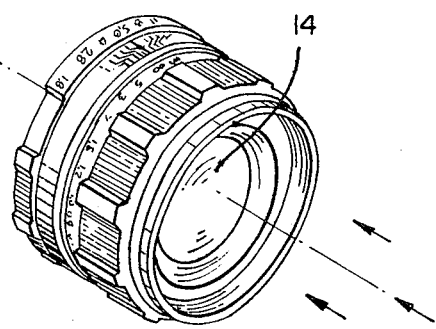

FIG. 4 illustrates a diagrammatic view of a known circuit and may utilize either a selenium type cell or a cadmium sulfide or silicon type cell, but in the present illustration would be representative of a selenium type cell devoid of battery, and illustrates typically a known mechanism by which the filtered light passing through the special inventive filter 6'' strikes the photosensitive cell 8'' because current through the circuit 9a'' and return circuit 9b'' controlling the mechanism 13 of aperture size.

FIG. 5 illustrates also the well known focal plane shutter camera in which the light being monitored passes directly through the lens 14, strikes the mirror 15 and is reflected upwardly through the lens 7aa, through a reflective prism 16 and through the viewfinder 17 with portions of the light striking the filter-carrying cells 8a and 8b, whereby current is passed through circuits 18 and 19 and 20. The construction and circuitry shown in this figure is conventional, the only difference in the conventional construction and the present invention being the embodiment of the inventive filter restricting or withholding the passing of light therethrough except for that of about the 4500 through 4800 band.

Accordingly, it is within the scope of the present invention to make such variations and modifications and substitution of equivalents as would be apparent to a person of ordinary skill. In that spirit, the filter of the type utilized in the present invention for limiting the light to the angstrom band ranging from about 4500 to about 4800 angstroms is well known as conventional and it is within the scope of the invention to utilize any conventional filter material or composition which accomplishes this function.

I claim:

1. A process for color photography comprising in combination: passing exposure light of broad spectrum along a first path through a predetermined light filter means which screens out light having wavelengths less than and greater than a range between about 4300 angstroms and about 5000 angstroms, directing filtered light therefrom into a photosensitive cell responsive to said range, registering the output of said cell, passing said exposure light of broad spectrum along a second path different than said first path, exposing a color sensitive photographic film with light following said second path, and regulating in direct proportion the exposure of the photographic film dependent upon the registered output of said cell, said broad spectrum including light of wavelengths outside of said range.

2. The process of claim 1 in which said filtered light has wavelengths rangings from about 4500 angstroms to about 4800 angstroms and in which said regulating comprises automatically controlling shutter speed of the camera.

3. A process of claim 1, in which said filtered light has wavelengths rangings from about 4500 angstroms to about 4800 angstroms and in which said regulating comprises automatically regulating iris diameter of a camera.

4. A photometer apparatus according to claim 1, in which said predetermined light filter means filters-out light having wavelengths below about 4500 angstroms and above about 4800 angstroms and transmits therethrough filtered light from 4500 angstroms to 4800 angstroms, and in which said filter means further includes a meter means with an indicator and operatively connected to indicate the output of said cell.

5. A photometer apparatus according to claim 1, in which said exposure includes a timer mechanism which decreases exposure time as intensity of light passed through said predetermined light filter increases and increases exposure time as intensity of light passed through said predetermined light filter decreases.

6. A color-photography photomer apparatus comprising in combination: a predetermined light filter means mounted to receive light of a broad spectrum and to screen-out light having wavelengths less than and more than a range between about 4300 angstroms and about 5000 angstroms and to pass light of a spectrum within said range, said light filter means including a photosensitive cell positioned to receive said filtered light and to be excluded from non-filtered broad spectrum light, said cell having an output proportional to the intensity of said filtered light received by said cell, exposure means for directing said broad spectrum light including light of wavelengths outside of said range to a color sensitive photographic film for exposing said film, said output from said cell being related to the proper exposure of said film to produce proper color rendition of said broad spectrum light.

7. A photometer apparatus according to claim 6, in which said exposure means includes an adjustable iris-aperture operatively connected to said cell, exposure-size of said aperture being responsive to said output.

\* \* \* \* \*